United States Patent
Sadek et al.

(10) Patent No.: US 8,744,506 B2
(45) Date of Patent: *Jun. 3, 2014

(54) DEVICE DISCOVERY ON WHITE SPACE FREQUENCIES

(75) Inventors: Ahmed K. Sadek, San Diego, CA (US); Avinash Jain, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 415 days.

This patent is subject to a terminal disclaimer.

(21) Appl. No.: 12/817,661

(22) Filed: Jun. 17, 2010

(65) Prior Publication Data

US 2011/0312330 A1 Dec. 22, 2011

(51) Int. Cl.
*H04B 7/00* (2006.01)

(52) U.S. Cl.
USPC ........ 455/511; 455/454; 455/503; 455/422.1; 455/436; 370/342; 370/328; 370/321

(58) Field of Classification Search
USPC .............. 455/431–463, 422.1, 464, 509, 511, 455/503; 370/491, 500, 321–338, 431–463, 370/339, 341–348
See application file for complete search history.

(56) References Cited

U.S. PATENT DOCUMENTS

| | | | | |
|---|---|---|---|---|
| 5,640,414 A | * | 6/1997 | Blakeney et al. | 375/130 |
| 8,335,202 B2 | * | 12/2012 | Prakash et al. | 370/343 |
| 2004/0063426 A1 | | 4/2004 | Hunkeler | |
| 2004/0259563 A1 | * | 12/2004 | Morton et al. | 455/452.2 |
| 2005/0197132 A1 | * | 9/2005 | Lee et al. | 455/450 |
| 2006/0251036 A1 | * | 11/2006 | Gollamudi et al. | 370/342 |
| 2007/0211680 A1 | | 9/2007 | Laroia et al. | |
| 2008/0076415 A1 | * | 3/2008 | Kang et al. | 455/434 |
| 2008/0076450 A1 | | 3/2008 | Nanda et al. | |
| 2008/0108359 A1 | * | 5/2008 | Zhu et al. | 455/446 |
| 2008/0108377 A1 | * | 5/2008 | Yoon | 455/501 |
| 2008/0159234 A1 | * | 7/2008 | Prakash et al. | 370/332 |
| 2009/0016293 A1 | | 1/2009 | Kang et al. | |
| 2009/0215457 A1 | | 8/2009 | Wang et al. | |
| 2009/0232098 A1 | * | 9/2009 | Makabe | 370/332 |
| 2009/0275286 A1 | | 11/2009 | Popovich et al. | |
| 2009/0298522 A1 | | 12/2009 | Chaudhri et al. | |
| 2010/0151864 A1 | | 6/2010 | Mori | |
| 2010/0216478 A1 | * | 8/2010 | Buddhikot et al. | 455/450 |

FOREIGN PATENT DOCUMENTS

| | | |
|---|---|---|
| JP | 2008278264 A | 11/2008 |
| WO | WO2004077753 A2 | 9/2004 |
| WO | WO2005101748 A1 | 10/2005 |
| WO | WO 2007/082249 * | 7/2007 .............. H04L 12/28 |

OTHER PUBLICATIONS

International Search Report and Written Opinion—PCT/US2011/04097, ISA/EPO—Sep. 22, 2011.

* cited by examiner

*Primary Examiner* — Ronald Eisner
(74) *Attorney, Agent, or Firm* — James K. O'Hare

(57) ABSTRACT

A method of wireless communication includes receiving a first signal on a first channel, determining a second channel based on the first signal, receiving a second signal on the second channel, and communicating with a wireless device on the second channel based on a quality of the second signal.

40 Claims, 12 Drawing Sheets

DEVICE DISCOVERY ON WHITE SPACE FREQUENCIES

BACKGROUND

1. Field

The following description relates generally to wireless communication and, more particularly, to device discovery on white space frequencies.

2. Background

White space refers to frequency spectrum that is not used by any licensed technology/primary user in many geographical locations. In the absence of a primary user, this frequency spectrum is available for use by any other user (i.e., secondary user) using any technology. A communication network over white space frequencies (or cognitive frequencies) is fundamentally different from more traditional deployments because the same frequency (or channel) may not be available at all locations because of the presence of a primary user (such as TV signal or a wireless microphone), and the same channel is shared by various devices using disparate technologies creating an interference pattern that changes spatially and temporally.

The unavailability of the same white space frequency and changes in the interference pattern compels a device in a wireless communication network, also called a network node, to select a frequency that is locally available and observes less interference from other devices. In a multipoint network, multiple receive nodes want to communicate with each other over the same wireless link, while in a point-to-point network, a transmit node wants to communicate with a specific receive node over the wireless link. The network nodes may use a certain negotiation protocol to select a frequency of communication. For example, in a point-to-point scenario, a receive node may broadcast a signature on the frequency the receive node has selected. After detecting the signature, the transmit node can either start communicating with the receive node on frequency selected by the receive node or invite the receive node to join the conversation at some other frequency. In a multipoint network, a node, acting as a group leader, can invite the other nodes to join the conversation at a frequency suitable for all nodes in the multipoint network.

The problem with such negotiation protocols is that while they are suitable for initialization and during power on, they are slow in scenarios where network nodes frequently change the communication group within a network, due to mobility, service change or otherwise. Each node has to scan through all available white space frequencies to detect the frequency on which the node can communicate with one node of a new group of nodes. Scanning through the available white space frequencies is impractical or inefficient. As such, there is a need in the art for an efficient method of device discovery on white space frequencies.

SUMMARY

In an aspect of the disclosure, a method of wireless communication includes receiving a first signal on a first channel, determining a second channel based on the first signal, receiving a second signal on the second channel, and communicating with a wireless device on the second channel based on a quality of the second signal.

In an aspect of the disclosure, a method of wireless communication includes obtaining information about a first channel, transmitting on the first channel a first signal including information about a second channel different from the first channel, and transmitting a second signal on the second channel.

In an aspect of the disclosure, a method of wireless communication includes communicating a set of channels to a first wireless device, communicating the set of channels to a second wireless device, and requesting the second wireless device to search for a secondary pilot signal transmitted from the first wireless device on a channel in the set of channels, the secondary pilot signal including information about a primary pilot signal.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Examples of apparatuses suitable for incorporating various aspects of the invention include, but are not limited to, a mobile station capable of operating in a wireless network. A mobile station may be referred to as user equipment, a mobile phone, a user terminal, a wireless terminal, a mobile device, a subscriber station, a wireless device, a wireless node, a terminal, an access terminal, a node, a handheld device, or some other suitable terminology. The various concepts described throughout this disclosure are intended to apply to all suitable apparatuses regardless of their specific nomenclature. Similarly a base station may be referred to as access point, point coordinating entity, or any apparatus that is responsible for control management within a wireless network.

Figure 1:
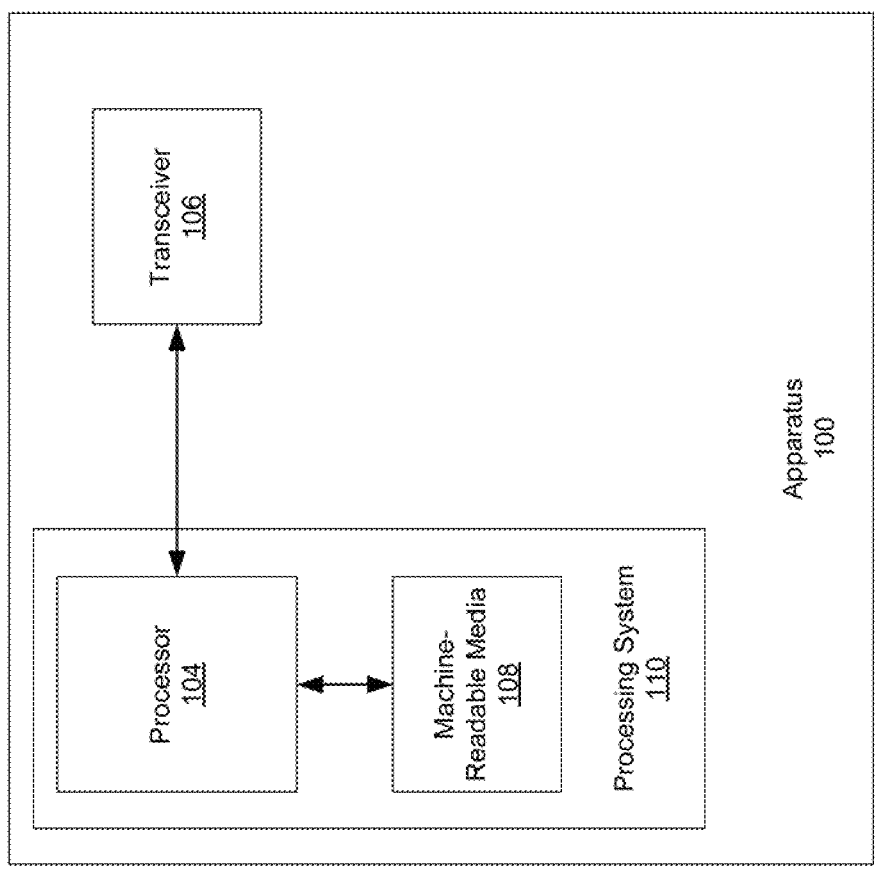
FIG. 1 is a block diagram illustrating a hardware configuration for an exemplary apparatus.

Various aspects of an apparatus will now be presented with reference to FIG. 1. FIG. 1 is a conceptual block diagram illustrating a hardware configuration for an apparatus 100. The apparatus 100 may be a base station, a mobile station, or otherwise another wireless device. The apparatus 100 includes a processor 104, machine-readable media (memory) 108 coupled to the processor 104, and a transceiver 106 coupled to the processor 104. The processor 104 and the machine-readable media 108 may together be referred to as a processing system 110. However, the processing system 110 may include the processor 104 without the machine-readable media 108 for certain processor 104 configurations.

The processing system 110 may include one or more processors. The one or more processors may be implemented with any combination of general-purpose microprocessors, microcontrollers, a Digital Signal Processors (DSP), Field Programmable Gate Arrays (FPGA), Programmable Logic Devices (PLD), controllers, state machines, gated logic, discrete hardware components, or any other suitable entities that can perform calculations or other manipulations of information.

The processing system 110 may also include the machine-readable media 108 for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 110 to perform the various functions described below, as well as other protocol processing functions.

The machine-readable media 108 may include storage integrated into one or more of the processors. The machine-readable media 108 may also include storage external to the one or more processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, the machine-readable media 108 may include a transmission line or a carrier wave that encodes a data signal. Those skilled in the art will recognize how best to implement the described functionality for the processing system.

Figure 2:
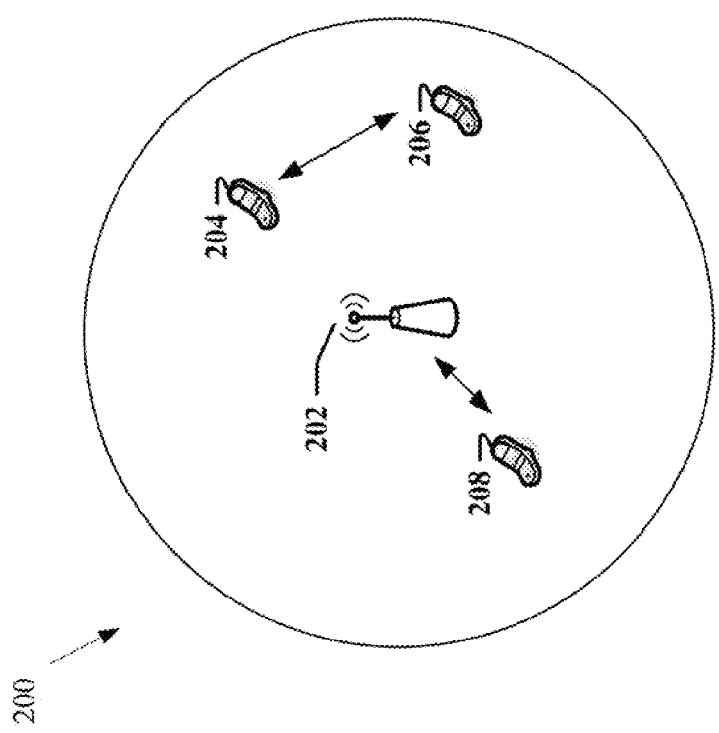
FIG. 2 is a diagram illustrating examples of a wireless communication networks over white space.

FIG. 2 is a diagram 200 illustrating examples of a wireless communication networks over white space. FIG. 2 illustrates a wireless local area network (WLAN) and a peer-to-peer (P2P) network. Alternatively, the wireless area network (WAN) may be a wireless personal area network (WPAN), wireless campus area network (WCAN), or wireless metropolitan area network (WMAN). In the WLAN, the MS 208 is served by the femto base station (BS) 202. The BS 202 may alternatively be a micro BS, a pico BS, or otherwise a low power class BS. The WLAN coverage area is relatively small due to transmit power restrictions or the high frequency nature of the white space band. Because the transmission range between the nodes 208, 202 is relatively small, the WLAN may select a common frequency in its coverage area for the communication without significantly interfering with other access points communicating at that common frequency. The BS 202 may be interconnected with other BSs. In the P2P network, the MS 204 and MS 206 are communicating using a white space frequency. The MSs 204, 206 may or may not be within the coverage area of the BS 202. For the communication networks described supra, there are two broad deployment scenarios as described in relation to FIG. 3A and FIG. 3B.

Figure 3:
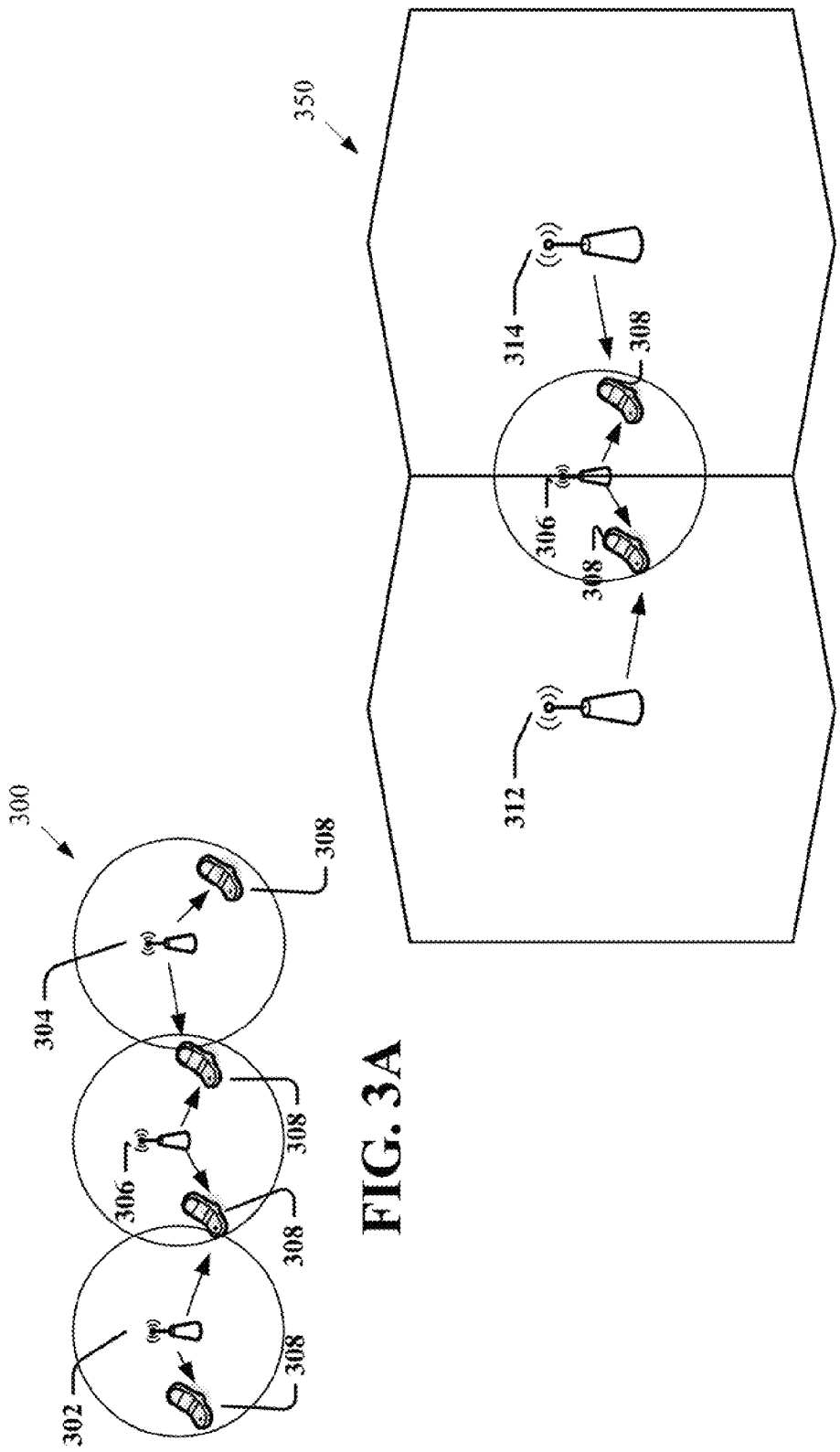
FIG. 3A is a diagram illustrating a first deployment scenario.
FIG. 3B is a diagram illustrating a second deployment scenario.

FIG. 3A is a diagram 300 illustrating a first deployment scenario. The first deployment scenario, which may be referred to as a "greenfield operation," is one in which a WLAN 306 is deployed among other WLAN stations 302, 304 on white space frequencies (e.g., TV UHF band). White space frequencies are a non-licensed band of frequencies. The MSs 308 are in communication with the WLAN 306 through a service provider who does not own a licensed spectrum in the deployment region (i.e., there are no macro base stations (i.e., high power class BSs) in the deployment region that receive and transmit on a licensed band and are owned by the service provider).

FIG. 3B is a diagram 350 illustrating a second deployment scenario. The second deployment scenario, which may be referred to as "capacity offload and femto deployment," is characterized by the presence of a wireless deployment on licensed frequency. In the second deployment scenario, a femto BS 306 that is receiving and transmitting on white space with MSs 308, is deployed among macro BSs 312, 314, which receive and transmit on a licensed band and are owned (and therefore controlled) by the service provider of the femto BS 306. The purpose of the overlay may be to increase capacity, provide high throughput coverage, or provide some additional services such as P2P, not traditionally provided by cellular networks. The frequency on the licensed band may be called an anchor frequency and each of the physical macro BS entities 312, 314 may be called an anchor BS. The BS 306, receiving and transmitting on white space, may be called a cognitive BS and the selected frequency may be called the cognitive frequency or the operational frequency/channel.

The cognitive BS may or may not be co-located with the anchor BS. Any solution that is applicable to the first deployment scenario (FIG. 3A) is also applicable to the second deployment scenario (FIG. 3B), as the cognitive BS 306 will have access to additional information provided by the anchor BSs 312, 314. As such, the availability of an anchor BS provides alternatives that are simpler and more reliable.

Figure 4:
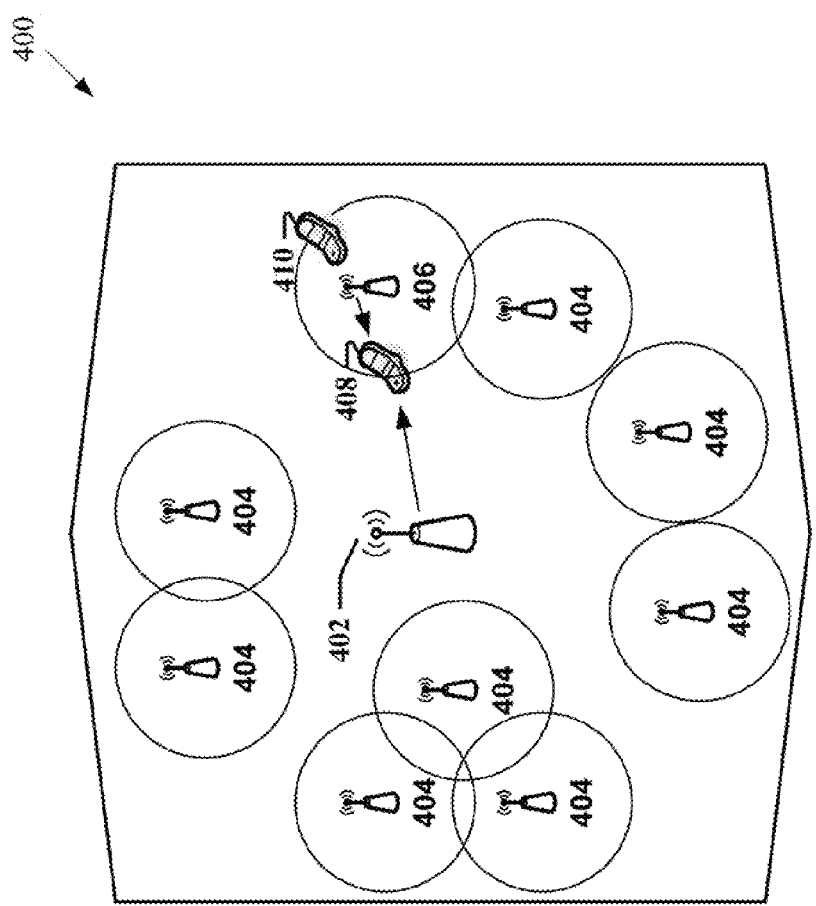
FIG. 4 is a diagram illustrating multiple cognitive base stations within a coverage area of an anchor base station.
Figures 5A, 5B:
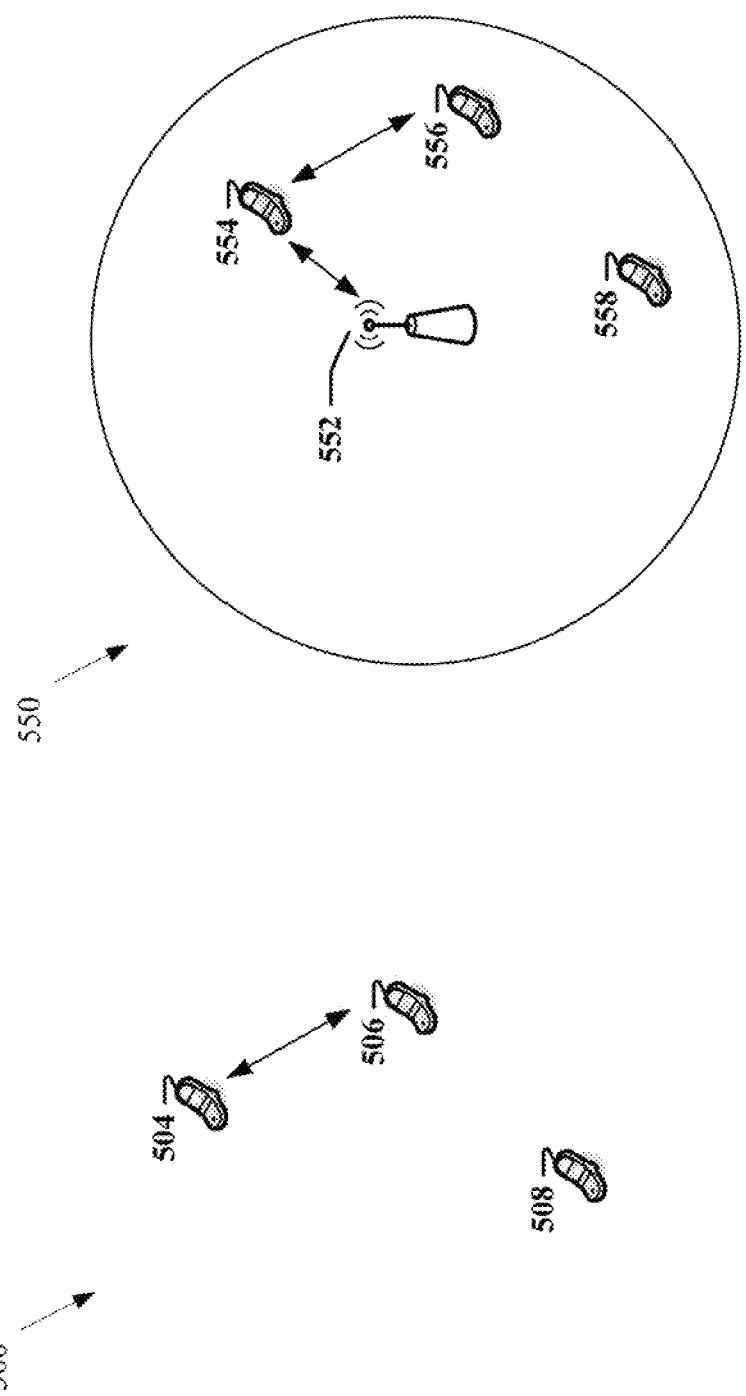
FIG. 5A is a diagram illustrating mobile stations in peer-to-peer communication in the first deployment scenario.
FIG. 5B is a diagram illustrating mobile stations in peer-to-peer communication in the second deployment scenario.

FIG. 4, FIG. 5A, and FIG. 5B are diagrams for illustrating exemplary methods. FIG. 4 is a diagram 400 illustrating multiple cognitive BSs 404, 406 within a coverage area of an anchor BS 402. FIG. 5A is a diagram 500 illustrating MSs in P2P communication in the first deployment scenario (see FIG. 3A). FIG. 5B is a diagram 500 illustrating MSs in P2P communication in the second deployment scenario (see FIG. 3B). In FIG. 4, the MS 408 is connected to anchor BS 402 on a licensed frequency. However, for network and/or user performance, the network prefers that the MS 408 connect to the cognitive BS 406. In FIG. 5A, the MS 504 is in P2P communication with the MS 506, but would like to be in P2P communication with the MS 508 instead. In FIG. 5B, the MS 554 is in communication with the MS 556 or in communication with the anchor BS 552 on a licensed frequency would prefer a direct P2P communication with the MS 558. As discussed infra, methods through which an MS can detect a new cognitive BS or a new P2P device are provided irrespective of the white space frequency on which the device is communicating.

Referring to FIG. 4, the cognitive BSs 404, 406 and the anchor BS 402 are assumed to be in communication wirelessly, directly through backhaul connections, or indirectly through a backhaul server. The backhaul server may be a BS (e.g., anchor BS 402) or a server over the Internet. If the cognitive BS receives a signal from the anchor BS with a good strength, the cognitive BS is in the coverage area of the anchor BS. For each anchor BS, the server may maintain information on cognitive BSs in the coverage area of the anchor BS. In addition, for each cognitive BS, the server may maintain information for the associated anchor BS and the operational white space frequency used by the cognitive BS.

According an exemplary method, the cognitive BS 406 transmits a primary pilot at its operational frequency and a secondary pilot at a second frequency. The cognitive BS 406 is in the coverage area of the anchor BS 402 operating on a licensed frequency. The anchor BS 402 asks the MS 408 to measure on a set of frequencies. The set of frequencies includes the second frequency. The MS 408 tunes to the second frequency and receives the secondary pilot. The secondary pilot includes information about the operational frequency for receiving the primary pilot from the cognitive BS 406. If the secondary pilot is received with a sufficient signal quality (e.g., strength), the anchor BS 402 may ask the MS 408 to tune to the operational frequency to receive the primary pilot. If the primary pilot is received with a sufficient signal quality, the MS 408 may be handed off from the anchor BS 402 to the cognitive BS 406.

The second frequency may be selected in various ways. In one configuration, the secondary frequency is the operational frequency of the anchor BS 402. In another configuration, the secondary frequency is a white space frequency. In such a configuration, the anchor BS 402 asks the cognitive BSs 404, 406 in its coverage area to measure an interference (i.e., energy) on each of the white space frequencies. Alternatively, the anchor BS 402 may ask other wireless devices such as MSs with which the anchor BS is serving to measure an interference on each of the white space frequencies. The anchor BS 402 receives information about the interference on each of the white space frequencies. The anchor BS 402 orders/ranks the white space frequencies in an order of interference and selects a set of white space frequencies with the least interference (i.e., least used/lowest energy). The anchor BS 402 may select the set of white space frequencies such that operational frequencies of the cognitive BSs 404, 406 are not in the set of white space frequencies. The anchor BS 402 informs the cognitive BSs 404, 406 of the set of white space frequencies. The cognitive BS 406 selects one white space frequency in the set of white space frequencies for its secondary frequency. The anchor BS 402 informs the MS 408 to measure the signal quality of pilots transmitted on white space frequencies in the set of white space frequencies, and if any of them have a signal quality above a threshold, the MS 408 measures the signal quality of the primary pilot at the operational frequency and reports the signal quality information back to the anchor BS 402. The anchor BS 402 uses the primary pilot signal quality information to determine whether to handoff the MS 408 to the cognitive BS 406 associated with the measured primary pilot.

As discussed supra, the second selected frequency may be the licensed frequency used by the anchor BS 402 in whose coverage area the cognitive BS 406 is in. In such a configuration, the selection process for the second frequency is simple and the measurement would not require the MS to tune to a different frequency, thereby allowing the discovery of the cognitive BS device to be fast. However, if there are a large number of cognitive BSs in the coverage area of the anchor BS 402, the interference created by the beacons or the pilots on the licensed frequency can be large thereby affecting the capacity of the anchor BS 402.

As discussed supra, the secondary frequency may be a white space frequency. The interconnected server (which may be the anchor BS 402) may help select the secondary frequency. In such a configuration, the cognitive BS 406 reports to the server the list of available white space frequencies. The list can be ordered in decreasing order of interference observed at that frequency. The white space frequency is considered available when the cognitive BS 406 and any of the MSs already connected to the cognitive BS (e.g., MS 410) do not detect the presence of a primary user (such as television or wireless microphone). For each anchor BS, the server selects M frequencies on which a beacon or secondary signature can be sent by the cognitive BS 406 in its coverage area. To reduce the inter-frequency list of an anchor BS, the set of M white space frequencies is kept as small as possible. A value of M=1 may be preferred, but M may be selected to be greater than one, as it is important that at least one out of M frequencies is available with small interference at every cognitive BS in the coverage area of the anchor BS 402. The server reports the set of M white space frequencies to the anchor BS 402 (if the server is not the anchor BS 402) and to the cognitive BS 406. The cognitive BS 406 selects one white space frequency from the set of the M white space frequencies for transmitting a secondary pilot signal that includes information about its operational frequency on which a primary pilot signal is transmitted.

Figure 6:
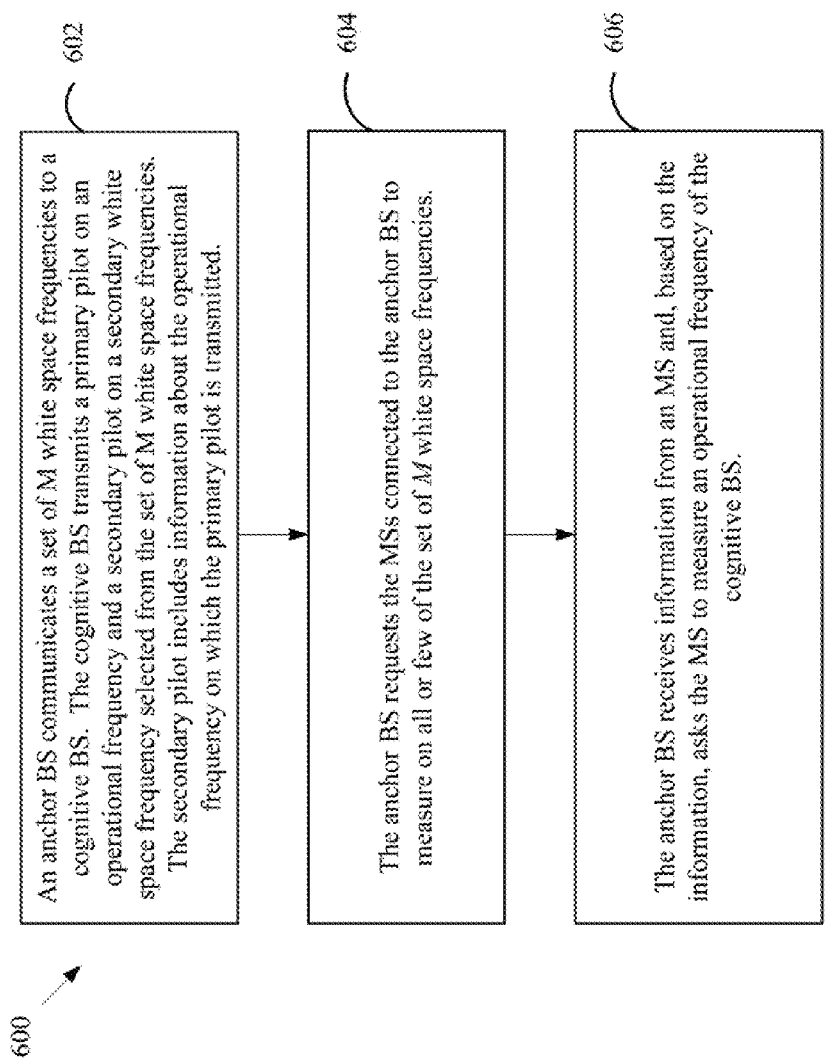
FIG. 6 is a flow chart illustrating a three step protocol for determining the presence of the cognitive base station.

FIG. 6 is a flow chart 600 illustrating a three step protocol for determining the presence of the cognitive BS 406. An anchor BS communicates a set of M white space frequencies to a cognitive BS (602). The cognitive BS transmits a primary pilot/beacon on an operational frequency and a secondary pilot/beacon on a secondary white space frequency selected from the set of M white space frequencies (602). The secondary pilot includes information about the operational frequency on which the primary pilot is transmitted (602). That is, the cognitive BS transmits a secondary pilot at a very small rate on a white space frequency and the secondary pilot includes information about an operational frequency on which a primary pilot is transmitted. Given the high processing gain, the secondary pilot can generally be decoded even in a low signal to noise ratio (SNR) regime. As such, the cognitive BS may select the white space frequency for transmitting the secondary pilot even with a lower SNR. The transmit power of the secondary pilot can be power controlled by the cognitive BS to ensure that its detection range covers its coverage area, but does not create additional interference.

The anchor BS requests the MSs connected to the anchor BS to measure on all or few of the set of M white space frequencies (604). Based on the measurement report sent by an MS, the anchor BS can determine the cognitive BS with the best signal quality (e.g., largest signal strength) detected by the MS or a set of the cognitive BS with a signal quality above a threshold.

If the pilot quality of the secondary pilot from the cognitive BS is greater than a certain threshold, the anchor BS can ask the MS to measure the primary signature of the cognitive BS on its operational frequency if the MS is allowed to connect to the cognitive BS (606). If the primary signature from the cognitive BS is detected at an SNR greater than a certain threshold, the discovery of the cognitive BS is complete and handoff procedures may be initiated to transition the MS to communicating with the cognitive BS. If the primary signature strength is lower than the threshold, while the secondary pilot is received with a signal quality above a threshold, the anchor BS can request the cognitive BS to power control the pilot power, thereby reducing the false alarms.

A slight variation of the above protocol can be used for the first "greenfield" deployment scenario and in those cases where the handoff from the cognitive BS to another neighboring cognitive BS is desirable. In such a scenario, the cognitive BS may report on other cognitive BSs in its neighborhood to the server. The list could be updated over time via measurements. The server may then attempt to select a common beacon frequency for a cluster of neighboring cognitive BSs. Each cognitive BS receives information on the secondary frequency to transmit the beacon and the secondary frequencies used by its neighbors. Although an exemplary method was described in the context of a WLAN setting, as discussed supra, the exemplary method is applicable to other WAN, such as a wireless wide area network (WWAN), WPAN, WCAN, or WMAN.

Referring again to FIG. 5B, the following approaches may apply for device discovery in a P2P setting. In case of a frequency division duplexing (FDD) system, UL licensed frequency can be used for the device discovery phase and selecting a common cognitive frequency, while actual P2P communications can be through the cognitive frequency. However, devices transmitting on the UL licensed frequency can cause interference to the anchor BS 552. The interference can be reduced by properly designing the beacon signal and controlling the transmit power.

In many scenarios, the licensed frequency cannot be used for P2P device discovery. This can happen for example when the WAN footprint (of the anchor BS 552) is much larger than P2P distance. The devices can utilize the following approach, which is similar to the approach discussed supra with respect to a WLAN. First, an MS 554 may scan the available channels and rank the channels according to a measured interference power (available if there are no primary users occupying the channel). Second, the MS 554 reports the measurements to the anchor BS 552. Third, the anchor BS 552 selects a subset M of the available channels to be used to transmit the beacon. The value M may be small (e.g., M=1 or M=2). The M channels should be selected such that the MS 554 at least can use one of the channels in the subset M. Neighbor anchor BSs could exchange their corresponding selected channels and could jointly select the subset of M channels to minimize the differences among neighbor BS. Fourth, the anchor BS informs the MS 554 with the selected subset of channels and the channels used in neighbor cells.

The following protocol can be used for P2P device discovery. First, the MS 558 sends a beacon on one or more of the selected set M white space frequencies. The beacon contains information about the operational frequency of MS 558. The beacon is transmitted at a low rate and can be detected at low SNR. Second, the MS 554 is informed by the anchor BS 552 to scan periodically for beacons on the advertised set of channels. Third, if the MS 554 detects the beacon transmitted by the MS 558 and the beacon quality is above a certain threshold, the MS 554 can measure the primary signature of the MS 558 on its operational frequency and report to the anchor BS 552. At this point the device discovery phase is complete and protocols to connect the MS 554 to the MS 558 through a P2P connection can be initiated.

Referring again to FIG. 5A, slight variations of the aforementioned protocol can be used for P2P discovery when an anchor BS is not available. In such scenario, each network node scans the available channels and ranks the channels based on measured interference, and the best M channels are selected (e.g., M=1 or M=2). A network node sends a beacon on the selected M channels in a periodic fashion. Besides transmitting beacons on the selected M channels, each device listens to beacons transmitted from other devices on the M channels. The information received from other beacons in the neighborhood of the device can be incorporated into its own beacon message.

Figure 7:
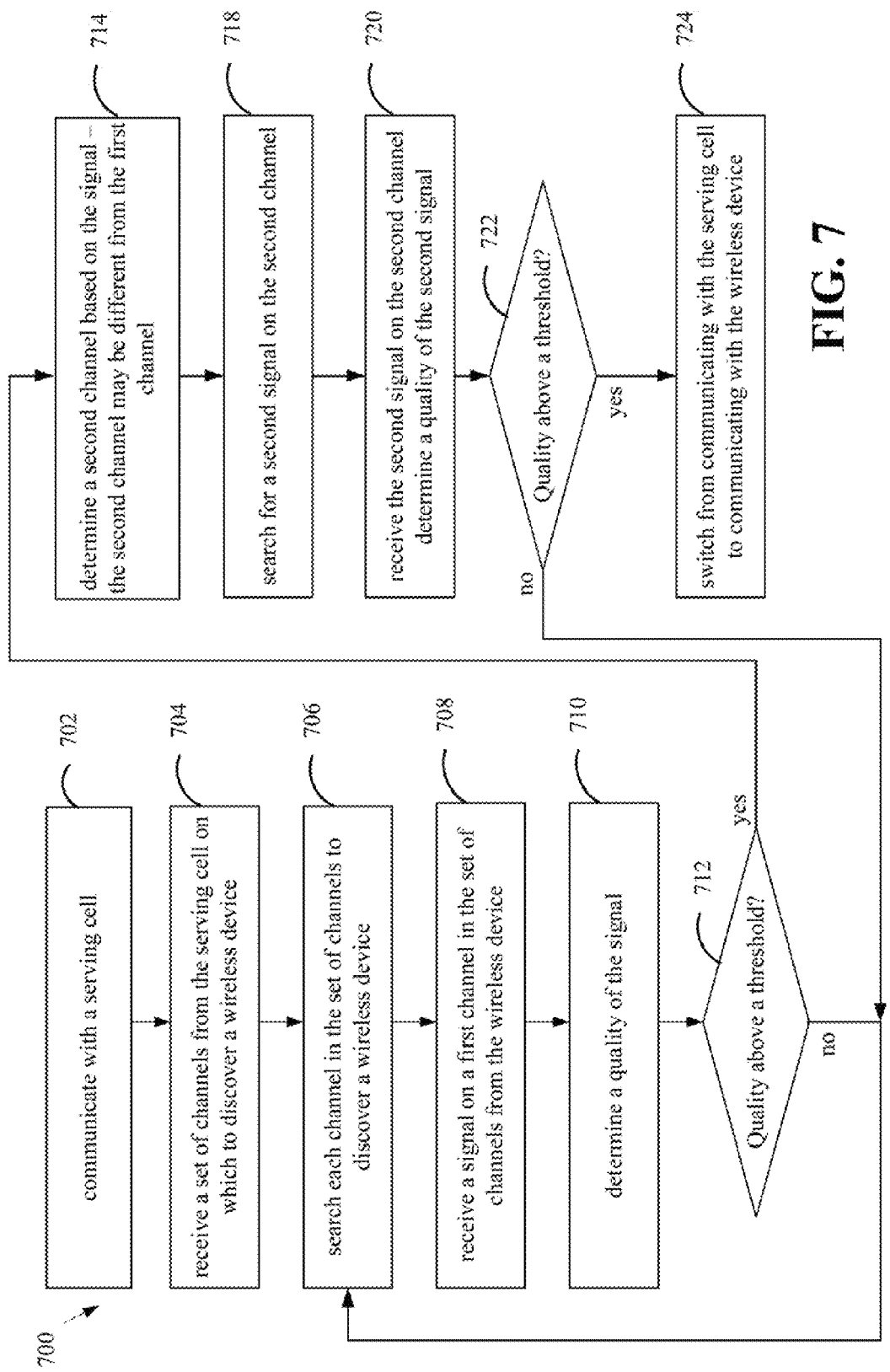
FIG. 7 is a flow chart of an exemplary method.

FIG. 7 is a flow chart 700 of an exemplary method. The exemplary method may be performed by an MS or otherwise another wireless device. In the method, the MS communicates with a serving cell (702). The MS receives a set of channels from the serving cell on which to discover a wireless device (704). The wireless device to discover may be a base station. Alternatively, the MS may receive the set of channels from another wireless device other than the serving cell. The MS searches each channel in the set of channels to discover a wireless device (706). The MS receives a signal on a first channel in the set of channels from the wireless device (708). Subsequently, the MS determines a quality of the signal (710). If the quality of the signal if not above a threshold (712), the MS continues to search the set of channels to discover a wireless device (706). Otherwise, if the quality of the signal is above the threshold (712), the MS determines a second channel based on the signal (714). That is, the signal includes information about a second channel. The second channel may be different from the first channel. The MS may then search for a second signal on the second channel (718). The MS receives the second signal on the second channel determines a quality of the second signal (720). If the quality of the signal if not above a threshold (722), the MS continues to search the set of channels to discover a wireless device (706). Otherwise, if the quality of the second signal is above the threshold (722), the MS may switch from communicating with the serving cell to communicating with the wireless device (724).

The set of channels may be a set of white space channels. Furthermore, the signal may be a secondary pilot received from the wireless device on a white space channel in the set of white space channels and the second signal may be a primary pilot received from the wireless device on an operational channel that is not in the set of white space channels.

Figure 8:
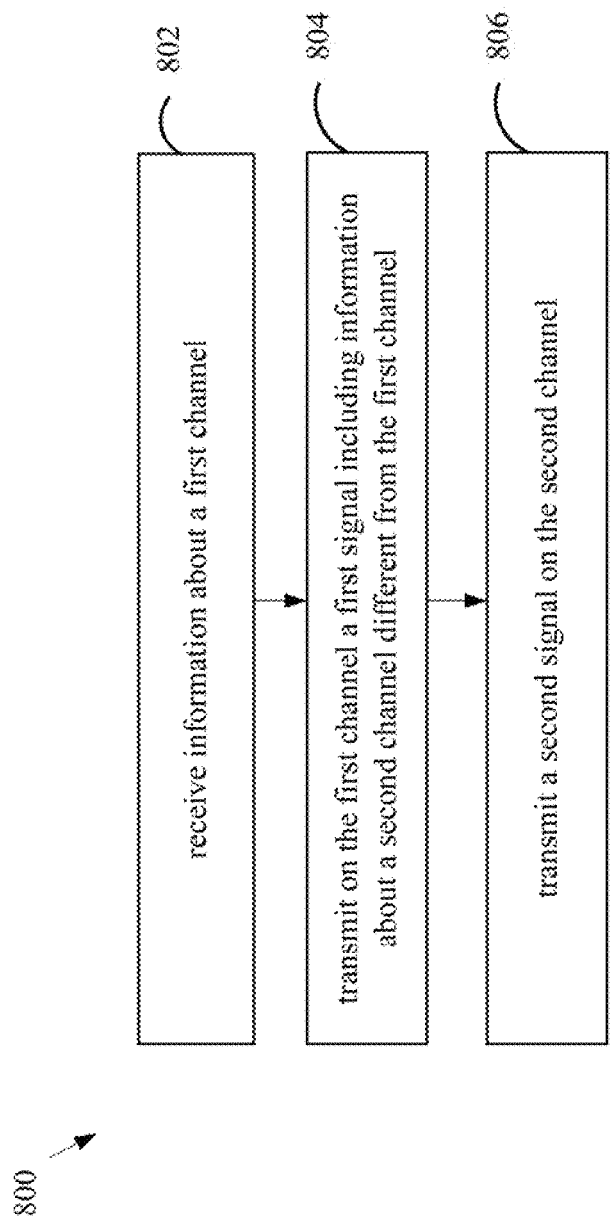
FIG. 8 is a flow chart of another exemplary method.

FIG. 8 is a flow chart 800 of an exemplary method. The exemplary method may be performed by a wireless device such as a cognitive BS or an MS in a P2P setting. The wireless device obtains information about a first channel (802). In addition, the wireless device transmits on the first channel a first signal including information about a second channel different from the first channel (804). Furthermore, the wireless device transmits a second signal on the second channel (806). In one configuration, the first signal is a secondary pilot, the second channel is an operational channel for traffic communications, and the second signal is a primary pilot transmitted on the operational channel.

In one configuration, the obtaining the information about the first channel includes determining an energy on a plurality of channels, selecting a set of lowest energy channels, and selecting the first channel from the set of lowest energy channels. This may occur when MSs in P2P communication are not in the coverage area of a macro BS with which they can communicate. In another configuration, the obtaining the information about the first channel includes receiving a set of channels and selecting the first channel from the set of channels. This may occur when MSs in P2P communication are in the coverage area of a macro BS with which they can communicate. This may also occur for cognitive BSs. In one configuration, the first channel is selected for transmitting the first signal based on a collaboration with neighboring wireless devices. In one configuration, the collaboration involves selecting the first channel that is the same channel as at least one of the neighboring wireless devices.

Figure 9:
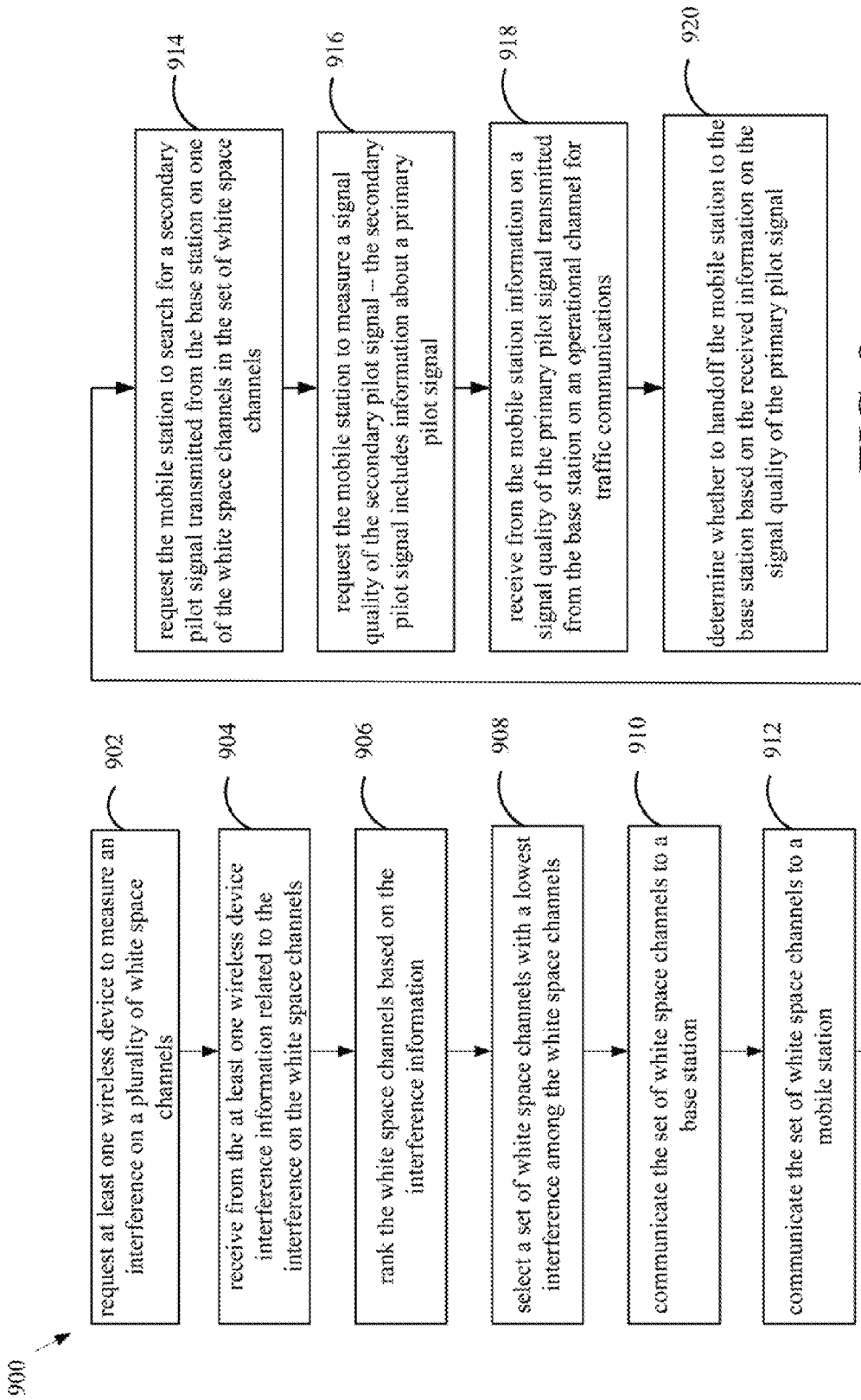
FIG. 9 is a flow chart of yet another exemplary method.

FIG. 9 is a flow chart 900 of an exemplary method. The exemplary method may be performed by a BS, such as an anchor BS or macro BS, or otherwise another wireless device. In the method, the BS requests at least one wireless device to measure an interference on a plurality of white space channels (902). The BS receives from the at least one wireless device interference information related to the interference on the white space channels (904). The BS ranks the white space channels based on the interference information (906). The BS selects a set of white space channels with a lowest interference among the white space channels (908). The BS communicates the set of white space channels to another BS, such as a cognitive BS (910). The cognitive BS may be a femto BS, micro BS, pico BS, or otherwise a BS with a lower power class than a BS performing the method. The BS communicates the set of white space channels to an MS or otherwise to another type of wireless device (912). The BS requests the MS to search for a secondary pilot signal transmitted from the cognitive BS on one of the white space channels in the set of white space channels (914). The BS requests the MS to measure a signal quality of the secondary pilot signal (916). The secondary pilot signal includes information about a primary pilot signal (916). If the signal quality of the secondary pilot signal is greater than a threshold, the MS will measure a signal quality of the primary pilot signal. The BS receives from the MS information on the signal quality of the primary pilot signal transmitted from the cognitive BS on an operational channel for traffic communications (918). Subsequently, the BS determines whether to handoff the MS to the cognitive BS based on the received information on the signal quality of the primary pilot signal (920).

Figure 10:
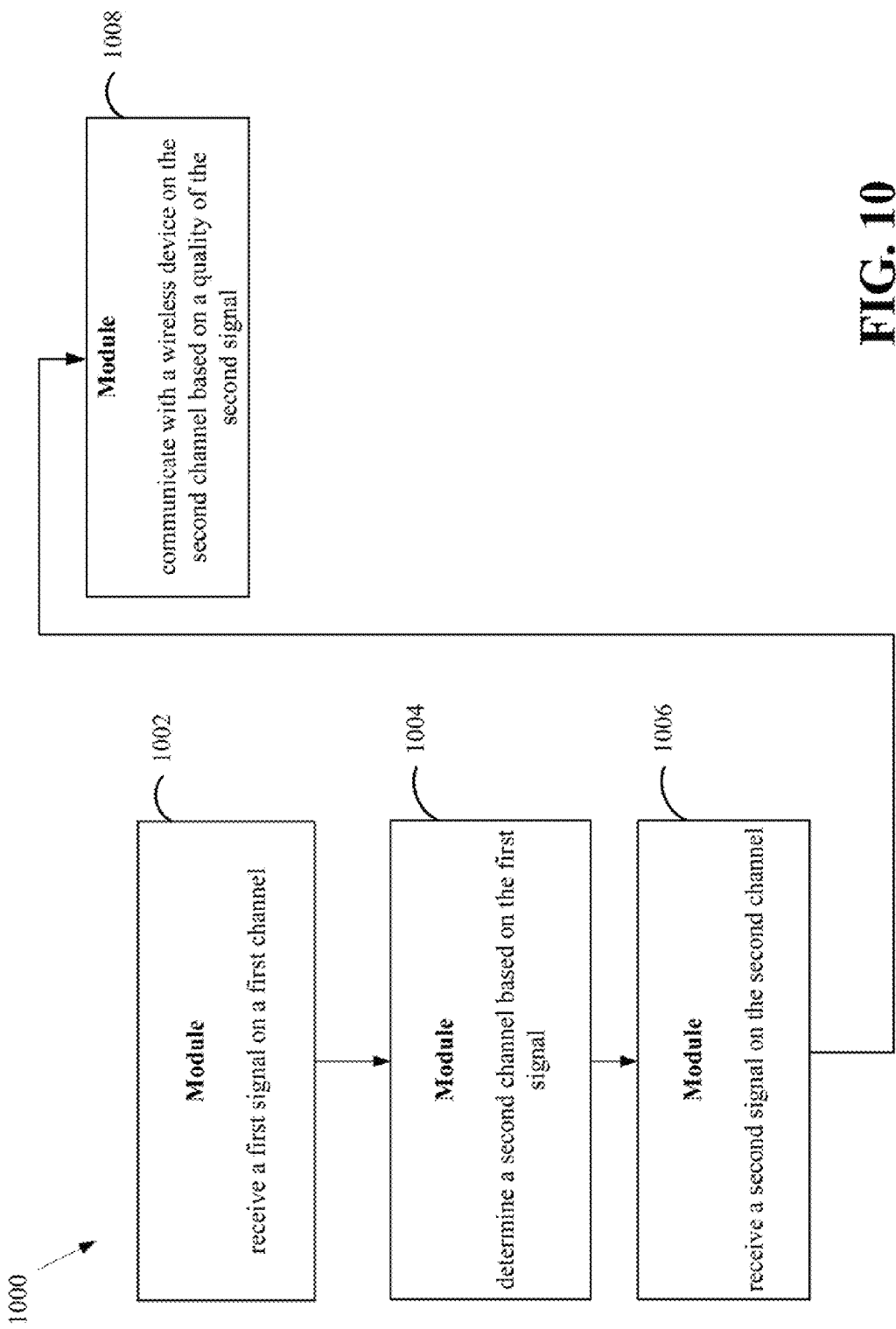
FIG. 10 is a modular diagram of an exemplary apparatus.

FIG. 10 is a modular diagram 1000 of an exemplary apparatus 100. The exemplary apparatus 100 may be an MS or otherwise another wireless device. The exemplary apparatus 100 includes a module 1002 that receives a first signal on a first channel, a module 1004 that determines a second channel based on the first signal, a module 1006 that receives a second signal on the second channel, and a module 1008 that communicates with a wireless device on the second channel based on a quality of the second signal.

Figure 11:
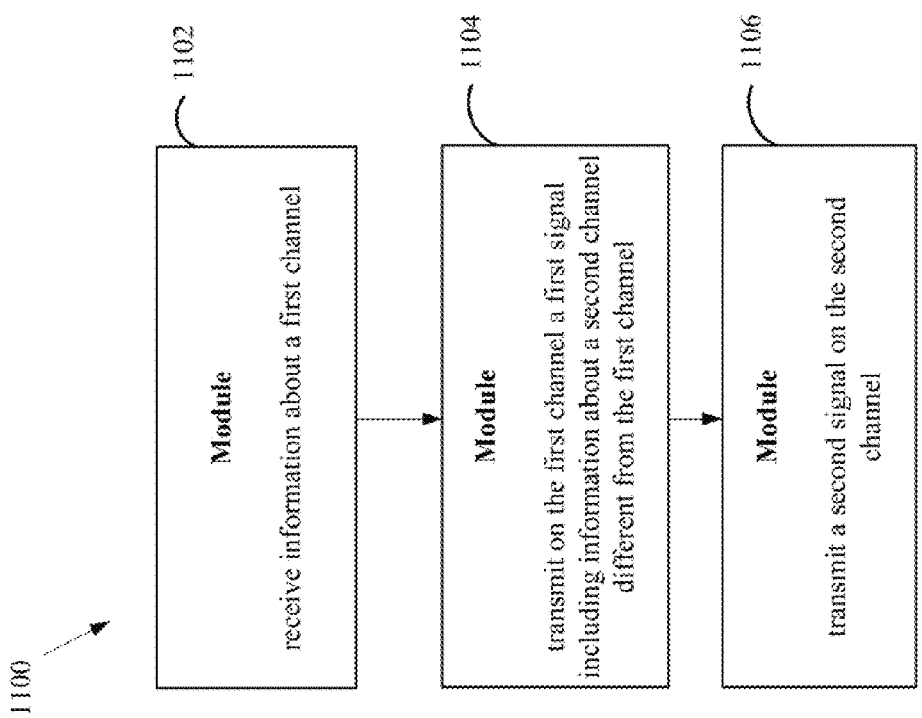
FIG. 11 is a modular diagram of another exemplary apparatus.

FIG. 11 is a modular diagram 1100 of an exemplary apparatus 100. The exemplary apparatus 100 may be an MS, a cognitive BS, or otherwise another wireless device. The exemplary apparatus 100 includes a module 1102 that receives information about a first channel, a module 1104 that transmits on the first channel a first signal including information about a second channel different from the first channel, and a module 1106 that transmits a second signal on the second channel.

Figure 12:
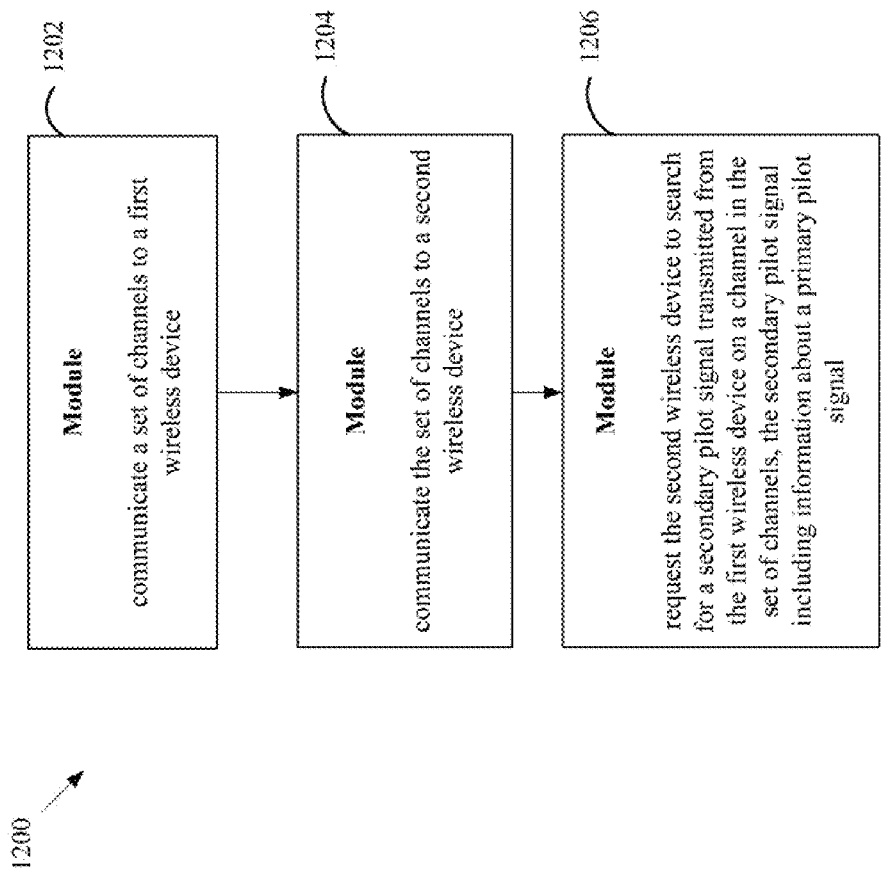
FIG. 12 is a modular diagram of yet another exemplary apparatus.

FIG. 12 is a modular diagram 1200 of an exemplary apparatus 100. The exemplary apparatus 100 may be a BS, such as an anchor BS or macro BS, or otherwise another wireless device. The exemplary apparatus 100 includes a module 1202 that communicates a set of channels to a first wireless device, a module 1204 that communicates the set of channels to a second wireless device, and a module 1206 that requests the second wireless device to search for a secondary pilot signal transmitted from the first wireless device on a channel in the set of channels. The secondary pilot signal includes information about a primary pilot signal.

Referring again to FIG. 1, in one configuration, the apparatus 100 is a macro BS and includes means for communicating a set of channels to a first wireless device, means for communicating the set of channels to a second wireless device, and means for requesting the second wireless device to search for a secondary pilot signal transmitted from the first wireless device on a channel in the set of channels, the secondary pilot signal including information about a primary pilot signal. In one configuration, the apparatus 100 further includes means for requesting at least one wireless device to measure an interference on a plurality of channels, means for receiving from the at least one wireless device interference information related to the interference on the channels, means for ranking the channels based on the interference information, and means for selecting the set of channels with a lowest interference among the channels. In one configuration the apparatus 100 further includes means for requesting each of at least one wireless device to provide a secondary pilot channel used for transmitting the secondary pilot signal and means for selecting the set of channels to include the secondary pilot channel of each of the at least one wireless device. In one configuration, the apparatus 100 further includes means for requesting the second wireless device to measure a signal quality of the secondary pilot signal. In one configuration, the apparatus 100 further includes means for receiving from the second wireless device information on a signal quality of the primary pilot signal transmitted from the first wireless device on an operational channel for traffic communications, and means for determining whether to handoff the second wireless device to the first wireless device based on the received information on the signal quality of the primary pilot signal. The aforementioned means is the processing system 110 configured to perform the function identified in each of the aforementioned means. Specifically, the aforementioned means in the processor 104 configured to perform the function identified in each of the aforementioned means.

In another configuration, the apparatus 100 is an MS (in P2P communication) or a cognitive BS and includes means for receiving a first signal on a first channel, means for determining a second channel based on the first signal, means for receiving a second signal on the second channel, and means for communicating with a wireless device on the second channel based on a quality of the second signal. In one configuration, the apparatus 100 further includes means for receiving a set of white space channels on which to discover the wireless device. The set of white space channels include the first channel. In one configuration, the apparatus 100 further includes means for searching each channel in the set of white space channels to discover the wireless device. In one configuration, the apparatus 100 further includes means for determining a quality of the first signal and means for searching for the second signal on the second channel when the quality of the first signal is above a threshold. In one configuration, the apparatus 100 further includes means for communicating with a serving cell, means for determining a quality of the second signal, and means for switching from communicating with the serving cell to communicating with the wireless device when the quality of the second signal is above a threshold. The aforementioned means is the processing system 110 configured to perform the function identified in each of the aforementioned means. Specifically, the aforementioned means in the processor 104 configured to perform the function identified in each of the aforementioned means.

In another configuration, the apparatus 100 is an MS and includes means for obtaining information about a first channel, means for transmitting on the first channel a first signal including information about a second channel different from the first channel, and means for transmitting a second signal on the second channel. In one configuration, the means for obtaining the information about the first channel includes means for determining an energy on a plurality of channels, means for selecting a set of lowest energy channels, and means for selecting the first channel from the set of lowest energy channels. In one configuration, the means for obtaining the information about the first channel includes means for receiving a set of channels and means for selecting the first channel from the set of channels. The aforementioned means is the processing system 110 configured to perform the function identified in each of the aforementioned means. Specifically, the aforementioned means in the processor 104 configured to perform the function identified in each of the aforementioned means.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication, comprising:
receiving a first signal on a first channel in a set of white space channels, the first signal being a secondary pilot received from a wireless device on the first channel for discovery of the wireless device, the secondary pilot including information about a second channel that is not a white space channel for receiving a primary pilot from the wireless device;
determining the second channel based on the first signal;
receiving a request to measure a signal quality of the secondary pilot;
sending information on a signal quality of the primary pilot signal when the signal quality of the secondary pilot is greater than a threshold;
receiving a second signal on the second channel; and
communicating with the wireless device on the second channel based on a quality of the second signal.

2. The method of claim 1, wherein the second channel is different from the first channel.

3. The method of claim 1, wherein the first signal comprises information about the second channel.

4. The method of claim 1, wherein the second signal is the primary pilot received from the wireless device on the second channel, the second channel being an operational channel for traffic communications with the wireless device.

5. The method of claim 1, further comprising receiving a set of channels on which to discover the wireless device, the set of channels comprising the first channel.

6. The method of claim 5, further comprising searching each channel in the set of channels to discover the wireless device.

7. The method of claim 1, further comprising:
communicating with a serving cell;
determining a quality of the second signal; and
switching from communicating with the serving cell to communicating with the wireless device when the quality of the second signal is above a threshold.

8. A method of wireless communication, comprising:
obtaining information about a first channel in a set of white space channels;
transmitting on the first channel a first signal, the first signal being a secondary pilot including information about a second channel used for transmitting a primary pilot, wherein the second channel is not a white space channel; and
transmitting a second signal on the second channel,
receiving a request to measure a signal quality of the secondary pilot signal;
sending information on a signal quality of the primary pilot signal when the signal quality of the secondary pilot signal is greater that a threshold;
wherein the obtaining the information about the first channel comprises:
determining an energy on a plurality of channels;
selecting a set of lowest energy channels; and
selecting the first channel from the set of lowest energy channels.

9. The method of claim 8, wherein the second channel is an operational channel for traffic communications and the second signal is the primary pilot transmitted on the operational channel.

10. The method of claim 8, wherein the obtaining the information about the first channel comprises:
receiving a set of channels; and
selecting the first channel from the set of channels.

11. The method of claim 10, wherein the first channel is selected for transmitting the first signal based on a collaboration with neighboring wireless devices.

12. The method of claim 11, wherein the collaboration involves selecting the first channel that is the same channel as at least one of the neighboring wireless devices.

13. A method of wireless communication, comprising:
communicating a set of channels to a first wireless device;
communicating the set of channels to a second wireless device;
requesting the second wireless device to search for a secondary pilot signal transmitted from the first wireless device on a white space channel in the set of channels, the secondary pilot signal including information about a primary pilot signal transmitted from the first wireless device on an operational channel that is not a white space channel;
requesting the second wireless device to measure a signal quality of the secondary pilot signal; and
receiving from the second wireless device information on a signal quality of the primary pilot signal when the signal quality of the secondary pilot signal is greater than a threshold, the primary pilot signal being transmitted from the first wireless device on the operational channel for traffic communications.

14. The method of claim 13, wherein the first wireless device is a base station and the second wireless device is a mobile station.

15. The method of claim 13, further comprising:
requesting at least one wireless device to measure an interference on a plurality of channels;
receiving from the at least one wireless device interference information related to the interference on the channels;
ranking the channels based on the interference information; and selecting the set of channels with a lowest interference among the channels.

16. The method of claim 13, further comprising:
requesting each of at least one wireless device to provide a secondary pilot channel used for transmitting the secondary pilot signal; and
selecting the set of channels to include the secondary pilot channel of each of the at least one wireless device.

17. The method of claim 13, further comprising:
determining whether to handoff the second wireless device to the first wireless device based on the received information on the signal quality of the primary pilot signal.

18. An apparatus of wireless communication, comprising:
means for receiving a first signal on a first channel in a set of white space channels, the first signal being a secondary pilot received from a wireless device on the first channel for discovery of the wireless device, the secondary pilot including information about a second channel that is not a white space channel for receiving a primary pilot from the wireless device;
means for determining the second channel based on the first signal;
means for receiving a request to measure a signal quality of the secondary pilot;
means for sending information on a signal quality of the primary pilot signal when the signal quality of the secondary pilot is greater than a threshold;
means for receiving a second signal on the second channel; and
means for communicating with the wireless device on the second channel based on a quality of the second signal.

19. The apparatus of claim 18, wherein the second channel is different from the first channel.

20. The apparatus of claim 18, wherein the first signal comprises information about the second channel.

21. The apparatus of claim 18, wherein the second signal is the primary pilot received from the wireless device on the second channel, the second channel being an operational channel for traffic communications with the wireless device.

22. The apparatus of claim 18, further comprising means for receiving a set of channels on which to discover the wireless device, the set of channels comprising the first channel.

23. The apparatus of claim 22, further comprising means for searching each channel in the set of channels to discover the wireless device.

24. The apparatus of claim 18, further comprising:
means for communicating with a serving cell;
means for determining a quality of the second signal; and
means for switching from communicating with the serving cell to communicating with the wireless device when the quality of the second signal is above a threshold.

25. An apparatus of wireless communication, comprising:
means for obtaining information about a first channel in a set of white space channels;
means for transmitting on the first channel a first signal, the first signal being a secondary pilot including information about a second channel used for transmitting a primary pilot, wherein the second channel is not a white space channel; and
means for transmitting a second signal on the second channel,
means for receiving a request to measure a signal quality of the secondary pilot signal;
means for sending information on a signal quality of the primary pilot signal when the signal quality of the secondary pilot signal is greater that a threshold;

wherein the means for obtaining the information about the first channel comprises:
means for determining an energy on a plurality of channels;
means for selecting a set of lowest energy channels; and
means for selecting the first channel from the set of lowest energy channels.

26. The apparatus of claim 25, wherein the second channel is an operational channel for traffic communications and the second signal is the primary pilot transmitted on the operational channel.

27. The apparatus of claim 25, wherein the means for obtaining the information about the first channel comprises:
means for receiving a set of channels; and
means for selecting the first channel from the set of channels.

28. The apparatus of claim 25, wherein the first channel is selected for transmitting the first signal based on a collaboration with neighboring wireless devices.

29. The apparatus of claim 28, wherein the collaboration involves selecting the first channel that is the same channel as at least one of the neighboring wireless devices.

30. An apparatus of wireless communication, comprising:
means for communicating a set of channels to a first wireless device;
means for communicating the set of channels to a second wireless device;
means for requesting the second wireless device to search for a secondary pilot signal transmitted from the first wireless device on a white space channel in the set of channels, the secondary pilot signal including information about a primary pilot signal transmitted from the first wireless device on an operational channel that is not a white space channel; and
means for requesting the second wireless device to measure a signal quality of the secondary pilot signal;
means for receiving from the second wireless device information on a signal quality of the primary pilot signal when the signal quality of the secondary pilot signal is greater than a threshold, the primary pilot signal being transmitted from the first wireless device on the operational channel for traffic communications.

31. The apparatus of claim 30, wherein the first wireless device is a base station and the second wireless device is a mobile station.

32. The apparatus of claim 30, further comprising:
means for requesting at least one wireless device to measure an interference on a plurality of channels;
means for receiving from the at least one wireless device interference information related to the interference on the channels;
means for ranking the channels based on the interference information; and
means for selecting the set of channels with a lowest interference among the channels.

33. The apparatus of claim 30, further comprising:
means for requesting each of at least one wireless device to provide a secondary pilot channel used for transmitting the secondary pilot signal; and
means for selecting the set of channels to include the secondary pilot channel of each of the at least one wireless device.

34. The apparatus of claim 30, further comprising:
means for determining whether to handoff the second wireless device to the first wireless device based on the received information on the signal quality of the primary pilot signal.

35. A non-transitory computer program product, comprising:
a non-transitory computer-readable medium comprising code for:
receiving a first signal on a first channel in a set of white space channels, the first signal being a secondary pilot received from a wireless device on the first channel for discovery of the wireless device, the secondary pilot including information about a second channel that is not a white space channel for receiving a primary pilot from the wireless device;
determining the second channel based on the first signal;
receiving a request to measure a signal quality of the secondary pilot;
sending information on a signal quality of the primary pilot signal when the signal quality of the secondary pilot is greater than a threshold;
receiving a second signal on the second channel; and
communicating with the wireless device on the second channel based on a quality of the second signal.

36. A non-transitory computer program product, comprising: a non-transitory computer-readable medium comprising code for:
obtaining information about a first channel in a set of white space channels;
transmitting on the first channel a first signal, the first signal being a secondary pilot including information about a second channel used for transmitting a primary pilot, wherein the second channel is not a white space channel; and
transmitting a second signal on the second channel,
receiving a request to measure a signal quality of the secondary pilot signal;
sending information on a signal quality of the primary pilot signal when the signal quality of the secondary pilot signal is greater that a threshold;
wherein the obtaining the information about the first channel comprises:
determining an energy on a plurality of channels;
selecting a set of lowest energy channels; and
selecting the first channel from the set of lowest energy channels.

37. A non-transitory computer program product, comprising:
a non-transitory computer-readable medium comprising code for:
communicating a set of channels to a first wireless device;
communicating the set of channels to a second wireless device;
requesting the second wireless device to search for a secondary pilot signal transmitted from the first wireless device on a white space channel in the set of channels, the secondary pilot signal including information about a primary pilot signal transmitted from the first wireless device on an operational channel that is not a white space channel;
requesting the second wireless device to measure a signal quality of the secondary pilot signal; and
receiving from the second wireless device information on a signal quality of the primary pilot signal when the signal quality of the secondary pilot signal is greater than a threshold, the primary pilot signal being transmitted from the first wireless device on the operational channel for traffic communications.

38. An apparatus for wireless communication, comprising:
a processing system configured to:
receive a first signal on a first channel in a set of white space channels, the first signal being a secondary pilot received from a wireless device on the first channel for discovery of the wireless device, the secondary pilot including information about a second channel that is not a white space channel for receiving a primary pilot from the wireless device;
determine the second channel based on the first signal;
receive a request to measure a signal quality of the secondary pilot;
send information on a signal quality of the primary pilot signal when the signal quality of the secondary pilot is greater than a threshold;
receive a second signal on the second channel; and
communicate with a wireless device on the second channel based on a quality of the second signal.

39. An apparatus for wireless communication, comprising:
a processing system configured to:
obtain information about a first channel in a set of white space channels;
transmit on the first channel a first signal, the first signal being a secondary pilot including information about a second channel used for transmitting a primary pilot, wherein the second channel is not a white space channel; and
transmit a second signal on the second channel,
receive a request to measure a signal quality of the secondary pilot signal;
send information on a signal quality of the primary pilot signal when the signal quality of the secondary pilot signal is greater that a threshold;
wherein, in order to obtain the information about the first channel, the processing system is configured to determine an energy on a plurality of channels, select a set of lowest energy channels, and select the first channel from the set of lowest energy channels.

40. An apparatus for wireless communication, comprising:
a processing system configured to:
communicate a set of channels to a first wireless device;
communicate the set of channels to a second wireless device;
request the second wireless device to search for a secondary pilot signal transmitted from the first wireless device on a white space channel in the set of channels, the secondary pilot signal including information about a primary pilot signal transmitted from the first wireless device on an operational channel that is not a white space channel;
request the second wireless device to measure a signal quality of the secondary pilot signal; and
receive from the second wireless device information on a signal quality of the primary pilot signal when the signal quality of the secondary pilot signal is greater than a threshold, the primary pilot signal being transmitted from the first wireless device on the operational channel for traffic communications.

* * * * *